United States Patent [19]
Keenleyside et al.

[11] Patent Number: 6,070,010
[45] Date of Patent: May 30, 2000

[54] SYSTEM AND METHOD OF LOCAL DATA ALIGNMENT FOR STACK MEMORY

[75] Inventors: John Dawson Keenleyside; Kevin Alexander Stoodley, both of Ontario, Canada

[73] Assignee: International Business Machines Corporation, Armonk, N.Y.

[21] Appl. No.: 09/052,314

[22] Filed: Mar. 31, 1998

[30] Foreign Application Priority Data

Jul. 25, 1997 [CA] Canada ................................. 2211515

[51] Int. Cl.[7] ........................................................ G06F 9/45
[52] U.S. Cl. ......................... 395/705; 395/709; 395/707; 395/708; 712/204; 712/300
[58] Field of Search ........................... 395/705, 707–709; 711/201; 712/204, 205, 225, 200, 300

[56] References Cited

U.S. PATENT DOCUMENTS

| | | | |
|---|---|---|---|
| 5,335,332 | 8/1994 | Christopher, Jr. et al. | 711/201 |
| 5,448,746 | 9/1995 | Eickemeyer et al. | 712/210 |
| 5,487,158 | 1/1996 | Amelina et al. | 395/705 |
| 5,490,256 | 2/1996 | Mooney et al. | 712/227 |
| 5,590,358 | 12/1996 | Mizrahi-Shalom et al. | 712/204 |
| 5,802,372 | 9/1998 | Ishida | 395/705 |
| 5,913,054 | 6/1999 | Mallick et al. | 712/220 |
| 5,930,507 | 7/1999 | Nakahira et al. | 395/705 |

OTHER PUBLICATIONS

Hsieh et al, "Java bytecode to native code translation: the Caffeine prototype and preliminary results," MICRO–29, Proceedings of the 29th Annual IEEE/ACM International Symposium on Microarchitecture, pp. 90–97, Dec. 1996.
Bergh et al, "HP300 Architecture," Proceedings of Compcon Fall 79, pp. 62–66, Sep. 1979.

Primary Examiner—Emanuel Todd Voeltz
Assistant Examiner—Tuan Q. Dam
Attorney, Agent, or Firm—Scully, Scott, Murphy & Presser; Jay P. Sbrollini, Esq

[57] ABSTRACT

A system and method for aligning data in stack memory in a data processing system where the stack memory provides temporary storage for storing parameters for a function call. The method first determines if any of the parameters in the function being call are of a selected type. If a parameter is of a selected type, code is generated for aligning the parameter on a stricter boundary than the default boundary for the stack memory. Code is then generated to align the remaining parameters in the function call on the default boundary in the stack memory. The aligned parameter in the stack provides a reference point which is used by the called function to align locally scoped variables in the stack. By aligning a parameter of a selected type on stricter boundary in the stack, for example, a double precision floating point aligned on an 8 byte boundary, the execution performance of the compiled program code is improved.

14 Claims, 6 Drawing Sheets

SYSTEM AND METHOD OF LOCAL DATA ALIGNMENT FOR STACK MEMORY

BACKGROUND OF THE INVENTION

1. Technical Field

The present invention relates to computer systems, and more particularly to a compiler system and method of local data alignment for stack memory for optimizing execution performance.

2. Prior Art

Modern data processing systems often utilize one or more so-called "stack" memories as temporary storage for return addresses, application parameters, local variables and other data which may be utilized during a data processing procedure. Stack memories are utilized in a last-in, first-out (LIFO) manner, and may be referenced either explicitly or implicitly by operating system or application procedures. Typically, an application within a data processing system places any required parameters within the stack memory, invoking a procedure which stores a return address on the stack. Next, local variables defined by specific work routines within the procedure are allocated onto the stack memory. Thereafter, data required by the procedure may be placed on the stack and retrieved during selected operations.

Data placed within the stack memory in a state-or-the-art data processing system is generally retrieved ("fetched") utilizing multi-byte data fetch operations. Most of today's modern microprocessors, such as the Intel Pentium (TM) processors, utilize a fetch instruction comprising four bytes of data aligned on a 4 byte boundary, i.e. 0 mod 4. For floating point operations, modern microprocessors often utilize a fetch operation comprising eight bytes of data aligned on an 8 byte boundary, i.e. 0 mod 8. Eight bytes of data are typically used for a "double precision" floating point word. Similarly, modern processors also store data in memory utilizing a multi-byte operation.

Those skilled in the art will appreciate that a single byte of data can always be retrieved from memory with a multi-byte data fetch instruction, in which the data byte of interest is retained and the other three bytes are ignored. However, when four consecutive bytes of data are required, it is not always possible to retrieve the required four consecutive bytes of data with a single multi-byte data fetch, due to possible misalignment. Similarly, when eight consecutive bytes of data for a double precision floating point fetch are required, the processor may not able to retrieve the required eight consecutive bytes with a single multi-byte data fetch if the bytes are not aligned in the stack memory.

Data which is not aligned on the proper boundary for the particular microprocessor on which the code is running will result in extra instruction cycles being executed to access the misaligned data. The penalty for misaligned data will vary depending on the type of processor, but it will be understood that the penalty in execution makes data alignment an important consideration in compiler design and performance.

As will be understood by those skilled in the art, the proper alignment for file scope data, i.e global data, is relatively straight forward since the global data is statically allocated. However, it is much more difficult to achieve alignment on the stack for function arguments and variables locally scoped to a function which comprise data types with stricter alignment requirements that the default boundary for stack alignment.

In the art, attempts have been made to solve the problem of aligned local variables by adjusting the amount of gross stack space allocated. However, this approach does not address the problem of aligning parameters in the parameter list of the function being called or the problem of aligning local variables with special alignment requirements.

Furthermore, the number of instructions required to maintain alignment of local data on the stack should be minimized. In other words, the cost of keeping function arguments and local variables aligned should be less than the loss in performance resulting from misaligned data.

Accordingly, there remains a need for a technique which provides optimal alignment for at least one selected argument having an alignment requirement that is stricter than the default alignment for the stack memory as provided for the operating system. Furthermore, such a compiler should also accommodate functions that can accept a variable number of arguments.

SUMMARY OF THE INVENTION

Accordingly, the present invention provides a compiler which optimizes the alignment in stack memory for at least one selected argument in a function or procedure call which has an alignment requirement that is stricter than the default alignment for the stack memory. The compiler according to the present invention also includes the capability to optimize the alignment of selected arguments for a call to a function having a variable number of arguments.

According to another aspect of the invention, the compiler utilizes a reference point in the stack memory which is aligned on the stricter boundary of interest in order to allocate the local variables for the called function in the stack without the need for generating extra instructions to align the stack pointer.

Another feature of the compiler according to the present invention is alignment of the lexically left most parameter which has special alignment requirements. This is particularly advantageous because a parameter with the special alignment requirements will not always appear as the first parameter in a function call. In another embodiment, an alignment is chosen which allows the greatest number of parameters having a special alignment requirement to be properly aligned.

In a first aspect, the present invention provides a method for aligning stack memory in a data processing system wherein the stack memory provides temporary storage for storing data during a call to a function having one or more parameters, said method comprising the steps of: (a) determining if any one of said parameters are of a selected type; (b) if a parameter is of said selected type, generating code for aligning said parameter on a special boundary in the stack memory and wherein said aligned parameter provides a reference point in the stack memory for the function being called for aligning variables local to the called function; (c) generating code for aligning the parameters not being of said selected type on a default boundary in the stack memory.

In a second aspect, the present invention provides a system for aligning stack memory in a data processing system wherein the stack memory provides temporary storage for storing data during a call to a function having one or more parameters, the system comprises: means for determining if any one of the parameters are of a selected type; means for generating code for aligning the parameter on a special boundary in the stack memory if a parameter is of the selected type and said aligned parameter providing a reference point for said called function for aligning local variables; means for generating code for aligning the parameters not being of the selected type on a default boundary in the stack memory.

In a third aspect, the present invention provides a system for aligning stack memory in a data processing system wherein the stack memory provides temporary storage for storing data during a call to a function having one or more parameters, said system comprising: means for determining if any one of said parameters is of a selected type; means for generating code for aligning said parameter on a special boundary in the stack memory if a parameter is of said selected type and said aligned parameter providing a reference point for said called function for aligning local variables in the stack memory; means for generating code for aligning the parameters not being of said selected type on a default boundary in the stack memory.

In a fourth aspect, the present invention provides a compiler for converting a high level source code program into a machine executable program, the compiler including a lexer, parser and semantic analyzer for translating high level source code program into an intermediate language, an optimizer for optimizing the intermediate language and a code generator for generating machine code from said intermediate language, the improvement comprising a stack alignment module in the code generator for aligning stack memory wherein the stack memory provides temporary storage for storing data during a call to a function having one or more parameters, said stack alignment module comprising: means for determining if any one of said parameters is of a selected type; means for generating code for aligning said parameter on a special boundary in the stack memory if a parameter is of said selected type and said aligned parameter providing a reference point in the stack memory for said function being called; means for generating code for aligning the parameters not being of said selected type on a default boundary in the stack memory.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
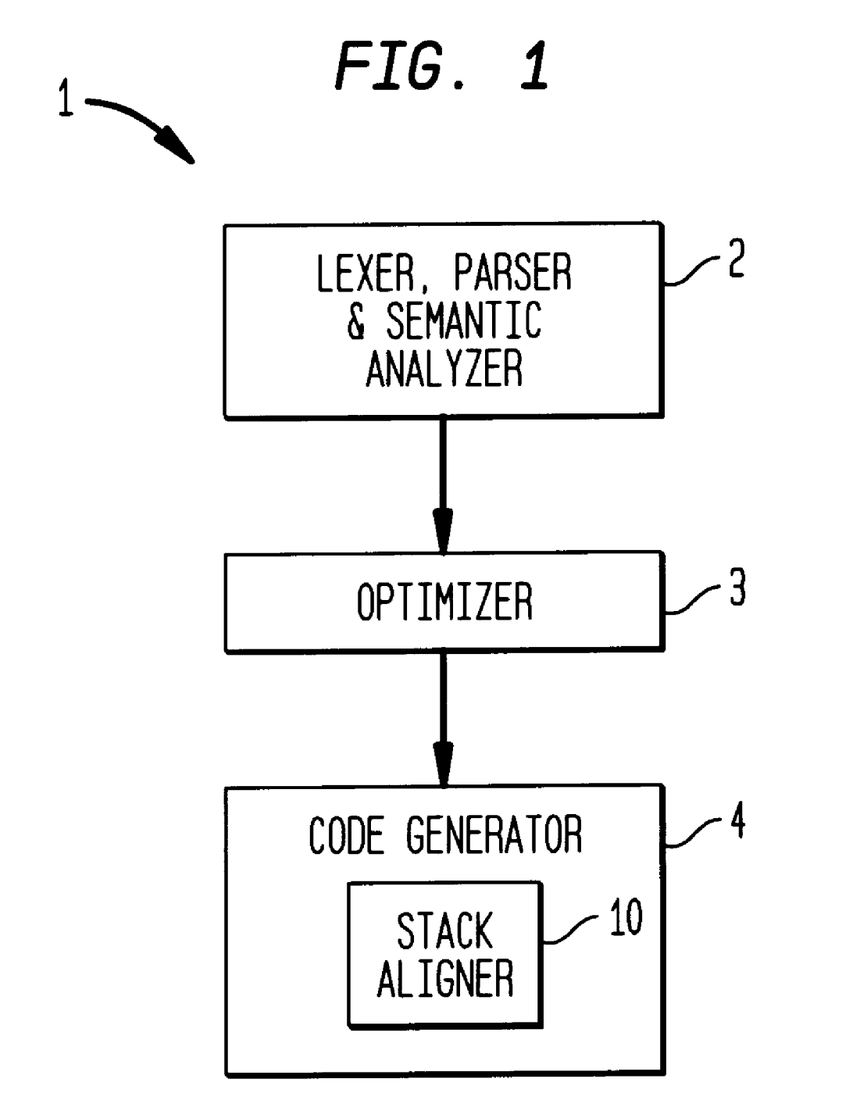
FIG. 1 shows in block diagram form a compiler incorporating stack memory alignment according to the present invention.

Reference is first made to FIG. 1 which shows a compiler 1 embodying a method for stack memory alignment according to the present invention.

The compiler 1 comprises a program which reads statements (i.e. source code) written in a human readable programmable language, such as Fortran, C or C++, and translates the statements into a machine-readable/executable program. The compiler 1 includes three principle components or modules: a lexer/parser/semantic analyzer 2, an optimizer 3, and a code generator 4.

The lexer/parser/semantic analyzer 2 translates the source code into an intermediate language (IL) which is understood by the compiler 1. The optimizer 3 performs various optimizing operations on the intermediate language (IL) to improve the execution performance of the compiled code. The code generator 4 translates the instructions in the intermediate language program into executable instructions for the target machine and produces an executable program.

The present invention is directed to a method in the code generator 4 for alignment of data in the stack memory and to a compiler 1 embodying the stack alignment method. The method is embodied in the compiler 1 as a module 10 in the code generator 4 for generating instructions (i.e. code) for aligning data in the stack memory. The stack memory of "stack" provides temporary storage for function arguments, return addresses and local variables for each thread of execution in a program. As will be understood by one skilled in the art, the stack is implemented as a data structure in which the first item inserted are the last ones removed.

As will now be described, the stack alignment method 10 according to the present invention applies special alignment rules to at least one type of parameter in the parameter list of a function. A feature of the present invention is the generation of alignment point(s) in the stack having a stricter alignment than the default boundary for the stack. The alignment point provides a reference point in the stack which is established by the calling function, i.e. the caller function. The reference point can then be used by the called function, i.e. the callee function, to maintain the stricter boundary alignment in the stack for its local variables without the need for additional run-time processing. In the following description, the term "parameter" is used in the formal sense to define the "type" for an input to a function, and the term "argument" is used to define the instance of a parameter being passed to a particular invocation of a function. The resulting alignment of the selected parameter type in the stack memory optimizes subsequent fetches of the parameter from the stack. In the following description, the parameter type selected for stricter alignment in stack memory is the double precision floating point data type which comprises 8 bytes of data on most modern microprocessors, such as the Intel Pentium™ and 486 processor families. The default alignment boundary for the stack in operating systems typically run on these processors is 4 bytes. It will however be understood that the method according to the present invention has wider applicability to other selected data types and is not limited to double precision floating point data types and a 4 byte default boundary in the stack.

Figure 2:
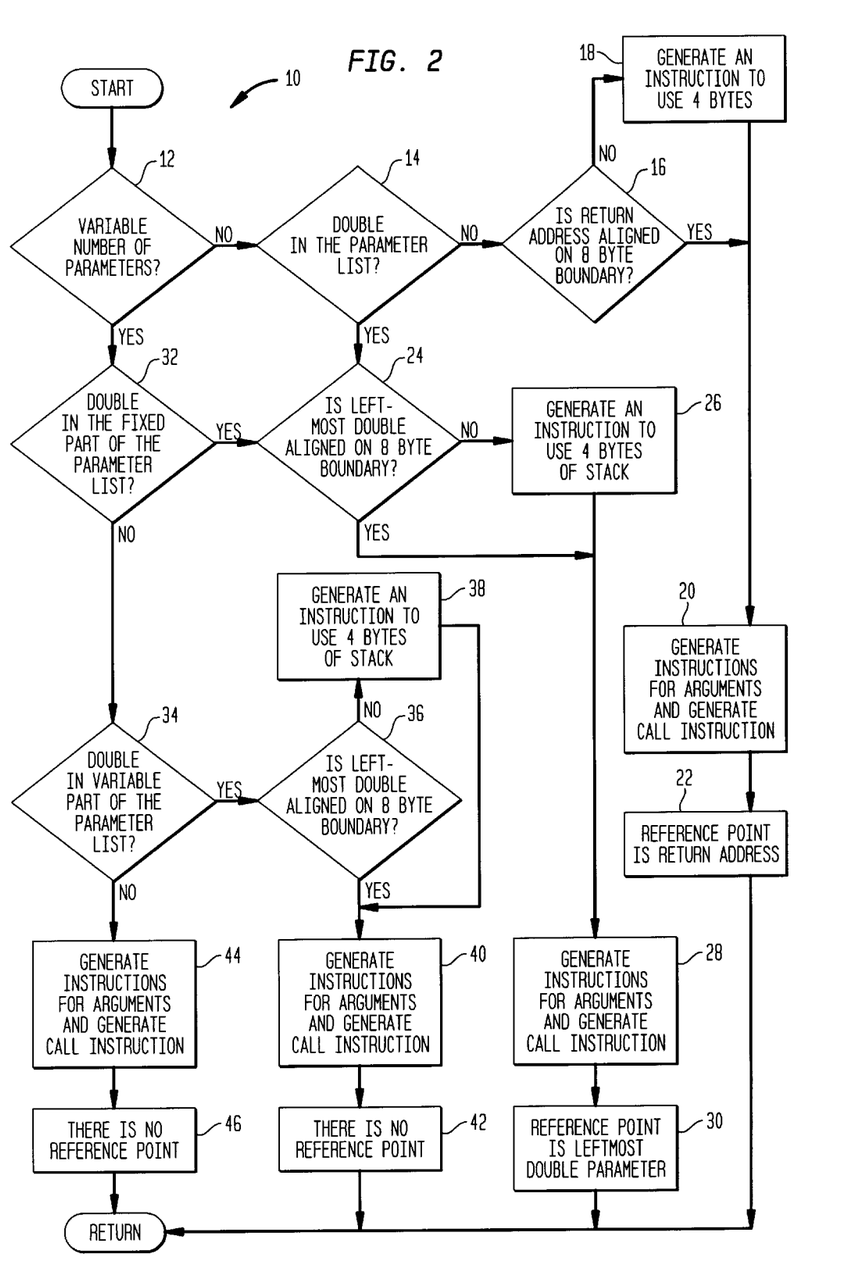
FIG. 2 is a detailed flow chart showing the method steps embodied in the compiler for generating data alignment in stack memory for a function call.

Reference is made to FIG. 2 which shows the steps for the procedure 10 embodied in the compiler 1 for generating the code for pushing data onto the stack memory for a function call. The code generator 4 in the compiler 1 calls the procedure 10 in order to generate the code for processing a call by the caller function.

The procedure 10 first determines if the function being called has a variable number of parameters (decision step 12). If the number of parameters in the function is not variable, the procedure 10 next checks for a double precision floating point data type in the parameter list for the function (decision step 14). If the function does not include a double precision parameter, the procedure 10 checks if the return address for the call to the function is aligned on the special (i.e. 8 byte) boundary, in decision step 16. By aligning the return address on an 8 byte boundary, a reference point is established in the stack for use by the callee function to maintain alignment of its locally scoped variables. If the return address is not aligned, then the procedure 10 generates "filler code", e.g an instruction which allocates filler bytes, in this case 4 bytes, in the stack (step 18). Next in step 20, the procedure 10 generates the code to pass the remaining arguments of the function and the code to call the function. The purpose of the call instruction is to transfer control to the callee function and to save the return address (i.e. in the caller function) in a known place. As a result of the stack adjustment in step 18, the return address becomes the reference point in the stack which is aligned on the special boundary, i.e. 8 byte boundary (step 22).

Returning to decision step 14, if there is a double precision float parameter in the function call, then the procedure 10 checks if the double precision argument is aligned on the special (i.e. 8 byte) boundary in decision step 24. If the function includes more than one double precision float argument, then the lexically left most parameter is selected for alignment on the special 8 byte boundary. (In another embodiment of the invention, if there more than one double precision floating point parameters, a group of the parameters are selected provided alignment can be achieved for all the parameters in the group. This aspect is described in further detail below.) If the double precision float is not aligned, then in step 26 the procedure 10 generates code (i.e. an instruction) for aligning the double precision float on the special (i.e. 8 byte) boundary. If the double precision float is already aligned, then the procedure 10 goes directly to step 28 and generates the code for pushing the remaining arguments onto the stack and the call instruction. The left most double precision float becomes the reference point (step 30) as a result of the alignment on the special 8 byte boundary. The callee function uses the reference point to maintain the stack alignment boundary for mapping its own local variables in the stack. The reference point also allows the callee function to create properly aligned reference points for subsequent calls which are made to the other function(s) from the callee function.

Referring back to decision step 12, if the function has a variable number of parameters, then the procedure 10 checks if there is a double precision float in the invariant portion of the parameter list (decision step 32). If the double precision float is located in the invariant portion of the parameter list, the procedure 10 proceeds with steps 24 through 30 as described above. If the function being called does not have a double precision float in the invariant portion, the procedure 10 goes to decision step 34.

In decision step 34, the procedure 10 determines if there is a double precision float in the variable portion of the parameter list for the function. If yes, the procedure 10 next checks if the double precision float is aligned on the special 8 byte boundary (decision step 36). If the function includes more than one double precision floating point argument, the procedure 10 selects the lexically left most double. If the double precision float is not aligned on the special boundary, the procedure 10 generates the filler code to align the stack pointer (step 38). If the double precision argument is aligned, the procedure 10 proceeds directly to generate the instructions for pushing the arguments onto the stack and the call instruction (step 40). Because the parameter selected for alignment on the special boundary is contained in the variable portion of the parameter list, the parameter cannot be used as a reference point (step 42). At compile time, the compiler will not know the parameter type for the callee function if the parameter appears in the variable portion of the parameter list. As a result, the compiler 1 will not be able to deduce the presence of a reference point in the variable portion of the parameter list.

Returning to decision step 34, if the variable portion of the parameter list does not include a double precision float, the procedure 10 proceeds to generate the instructions for the remaining arguments and the call instruction in step 44. In this case, the procedure 10 does not generate a reference point from aligned return address because the callee function will not be able to distinguish between an aligned double precision float or a reference point generated from an aligned return address (step 46).

In an alternative embodiment, the procedure 10 can utilize the following rule: a selected parameter (e.g. double precision float) is aligned if it appears in the invariant portion of the parameter list, and if there are not selected parameters in the invariant portion, the return address is aligned, even though the variant portion of the parameter list may include a selected parameter. However, the selection of the double precision parameter for alignment is preferable because improved execution can be achieved through the alignment of even one argument of type double precision float.

Figure 3:
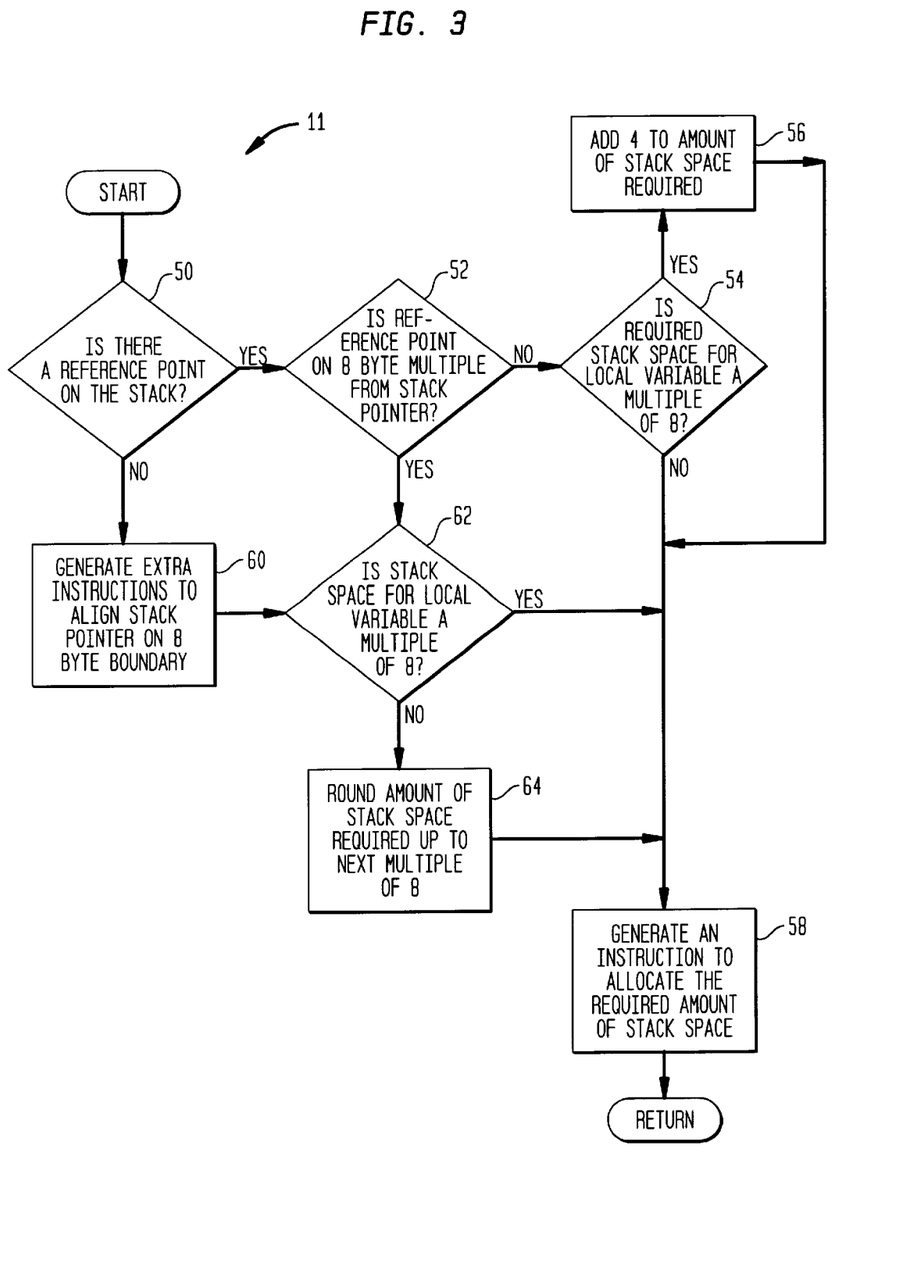
FIG. 3 is a detailed flow chart showing the method steps embodied in the compiler for allocating stack memory space for local variables.

According to another aspect, the present invention provides a method for aligning locally scoped variables in the stack, i.e. data variables defined locally in the callee function. The method for aligning locally scoped variables is implemented as a procedure 11 comprising the steps as shown in FIG. 3. It will be understood that this method is utilized by the compiler 1 to compile the code for the callee function.

Referring to FIG. 3, the procedure 11 for compiling the callee function first determines if a reference point has been established in the stack by the caller function (decision step 50), i.e. the procedure 11 looks for a double precision float in the parameter list at compile time. The procedure 11 next checks if the stack pointer is "8-byte aligned" with respect to a reference point (decision step 52). If the stack pointer is not 8 byte aligned with respect to the reference point, the procedure 11 checks if the stack space required for the local variables is a multiple of 8 (decision step 54). If the space needed is a multiple of 8, then the procedure 11 increases the stack space to make the stack pointer 8-byte aligned with respect to the reference point (step 56). If the stack space required for the local variables is not a multiple of the special boundary setting (i.e. 8 bytes), the procedure 11 proceeds directly to generate the code for allocating the required amount of stack space (step 58).

Returning to decision step 50, if the stack does not include a reference point, then the procedure 11 generates extra instructions to align the stack pointer (at run-time) on the next 8 byte boundary (step 60). Next in decision step 62, the procedure 11 checks if the stack space required for the local variables is a multiple of the special boundary setting (i.e. 8 bytes). If yes, then the procedure 11 proceeds directly to step 58 as described above. Otherwise, the procedure 11 rounds the amount of stack space required for the local variables up to the next multiple of 8 (step 64) before proceeding to step 58. As shown in FIG. 3, the decision step 62 is also entered from step 52, i.e. if the stack pointer is "8-byte aligned" with respect to a reference point.

The operation of the method according to the present invention will now be illustrated. In the following examples, four scenarios and an alternative embodiment are considered. The first example comprises a function with a fixed number of parameters. The second example considers a function with a fixed number of parameters where at least one of the parameters is aligned on a stricter boundary than the default boundary. The third example comprises a function with a variable number of parameters. The fourth example considers a function with a variable number of parameters where at least one of the parameters is aligned on a stricter boundary than the default. The fifth example describes another embodiment for present invention.

Figure 4:
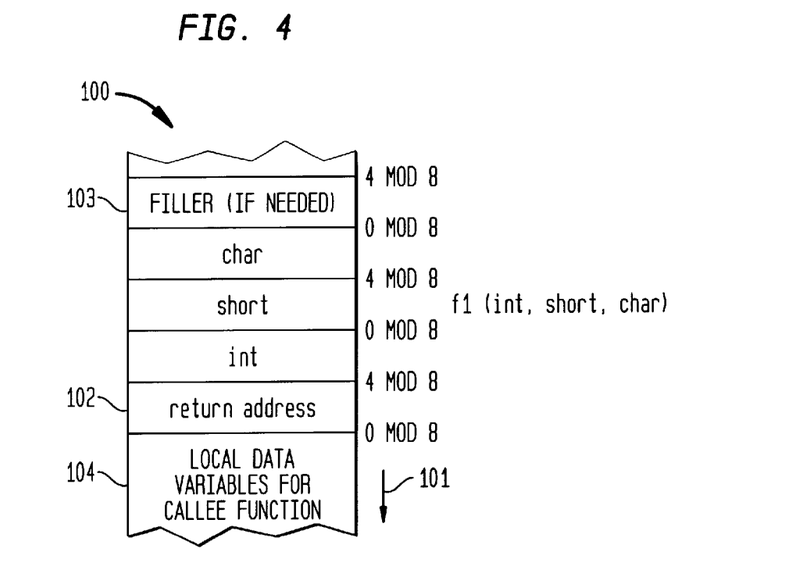
FIG. 4 depicts in diagrammatic form a first example of stack memory alignment according to the method of the present invention.

Reference is made to FIG. 4 which shows the resulting data alignment in a stack 100 for a call to a function f1. The function f1 (int,short,char) has an integer parameter, followed by a short parameter and a character parameter. The default alignment for the stack 100 is based on four byte boundaries and the stack 100 grows in the direction of arrow 101.

On entry to the function f1, the parameters char, short, int and the return address for the call to the function f1 have been pushed onto the stack 100 as shown in FIG. 4. Since none of the argument types require a stricter alignment than the default boundary, i.e. 4 data bytes, the compiler 1 embodying the method according to the present invention generates code for the caller(s) to the function f1 so that on entry to function f1 the stack pointer is aligned on the stricter alignment boundary, in this example, 8 byte boundaries, as denoted at 102. The call to the function f1 requires 4 bytes for the return address and 4 bytes for each argument for a total of 16 bytes. Thus, if the stack pointer is not aligned on an 8 byte boundary, the compiler 1 will generate code for 4 bytes of filler to be pushed onto the stack 100 at 103 before pushing on the arguments. This results in the return address being aligned on the 8 byte boundary at 102 as shown in FIG. 4. Local data variables defined in the function f1 are allocated in the stack 100 at 104.

Figure 5:
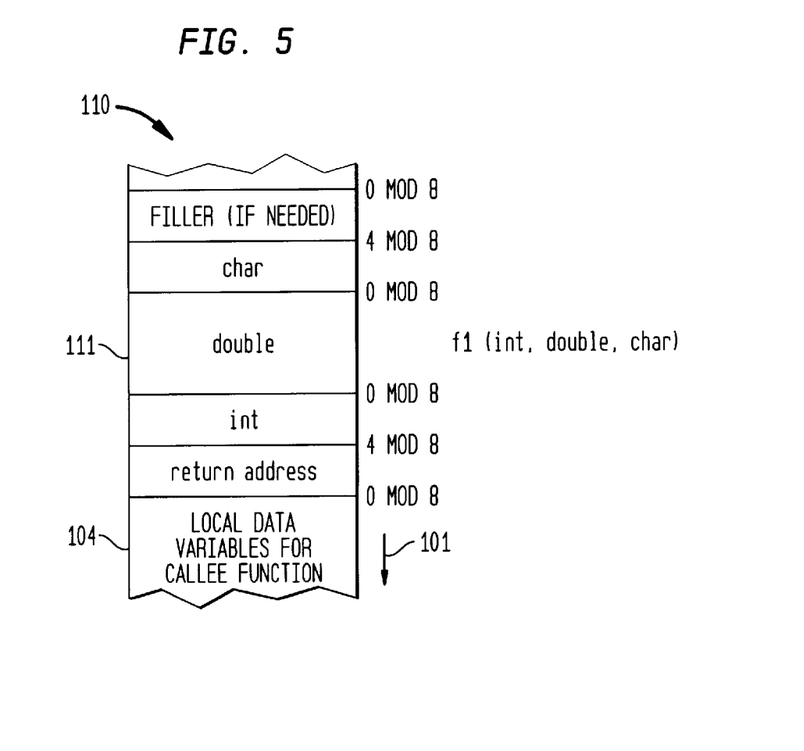
FIG. 5 depicts in diagrammatic form a second example of stack memory alignment according to the method of the present invention.

Reference is next made to FIG. 5 which shows the resulting layout in stack memory 110 for a function f2 comprising an integer argument int, followed by a double precision float parameter double, and a character parameter char. As discussed above for this embodiment of the invention, the compiler 1 aligns double precision floating point parameters, i.e. double, on an 8 byte boundary (instead of the default 4 byte boundary) as indicated at 111 for the stack 110 in FIG. 5.

If the function f2 has more than one parameter of type double, then the compiler 1 selects the lexically left most parameter of type double for alignment on the stricter 8 byte boundary at 111. This is particularly advantageous because a parameter with the special alignment requirements will not always appear as the first parameter in a function call.

Since the function f2 has a fixed number of parameters, the compiler 1 will know the alignment of the special argument at 111 and can take advantage of this when generating the code for pushing the arguments for the call to function f2 onto the stack 110.

Figure 6:
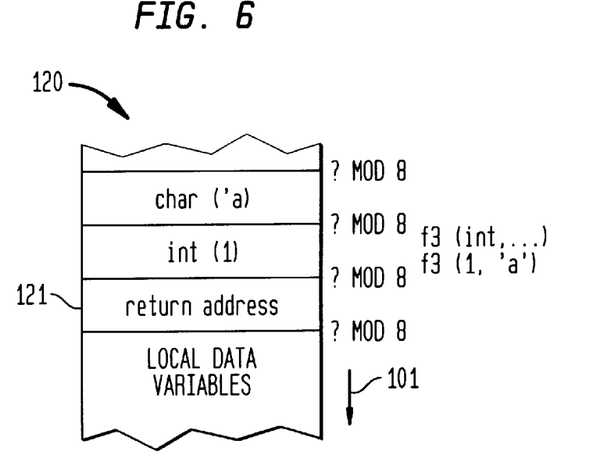
FIG. 6 depicts in diagrammatic form a third example of stack memory alignment according to the method of the present invention.

Reference is next made to FIG. 6 which shows the resulting stack memory layout 120 produced by the compiler 1 on entry to a function f3. The function f3 (int, . . . ) comprises one fixed integer parameter int and can accept an unknown number of additional parameters. For this example, during a particular call to the function f3 only one additional argument of type char is passed to the function f3. Because the parameters int and char do not require special alignment, the compiler 1 could generate code for the call to the function f3 in order to align the return address at 121. However, as will be described below with reference to FIG. 7, it is not always preferable to align the return address on the stricter boundary.

Figure 7:
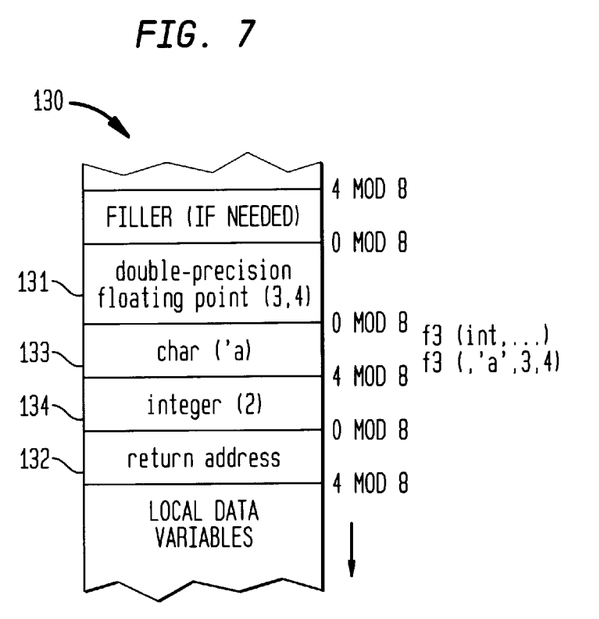
FIG. 7 depicts in diagrammatic form a fourth example of stack memory alignment according to the method of the present invention.

Referring to FIG. 7, the resulting layout for stack memory 130 is depicted for a call to function f3 where an argument of type double is passed to the function f3 after the argument int and char, i.e. in the variable portion of the parameter list. Because the call includes a double precision parameter, the compiler 1 aligns the double parameter on the stricter 8 byte boundary as shown at 131. As described above, in this embodiment the procedure 10 chooses to align on a double precision float in the variable portion of the parameter list instead of the return address.

If there are more than one double precision float parameters, then the compiler 1 would align the lexically left most parameter on the stricter 8 byte boundary. Thus for a function like f3 which accepts a variable number of parameters, the compiler 1 can either choose to align the return address (or any argument corresponding to a fixed parameter) or one of the double precision floating point parameters in the variable portion of the parameter list on the stricter (i.e. 8 byte) boundary. The selection of the double precision parameter is preferable because improved execution can be achieved through the alignment of even one argument of type double precision float.

Figure 8:
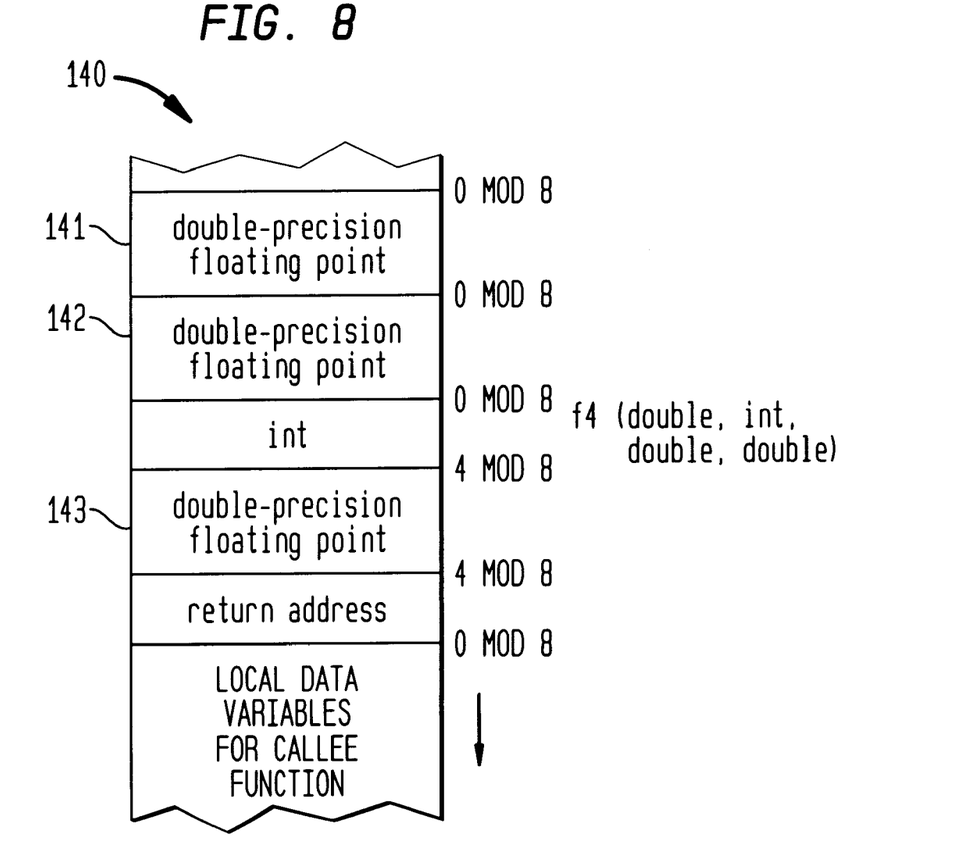
FIG. 8 depicts in diagrammatic form an example of stack memory alignment according to another embodiment of the present invention.

In another embodiment, instead of selecting the lexically left most parameter, an alignment choice is made so that the greatest number of parameters having the special alignment requirement (e.g. double precision floating point parameters) will be aligned in the stack. Reference is made to FIG. 8 which shows the resulting layout for stack memory 140 produced by the compiler 1 on entry to a function f4 according to this embodiment of the invention. The function f4 comprises the fixed parameters double1, int, double2 and double3. According to this embodiment, the two parameters double2 and double3 respectively are selected for alignment on the special alignment boundary (i.e. 8 byte boundary) instead of the parameter double1 which appears in the lexically leftmost position in the parameter list. As a result the parameters double2 and double3 are aligned on 8 byte boundaries in the stack 140 at 141 and 142 respectively. The lexically leftmost double precision float double1, however, will not be aligned on an 8 byte boundary as shown at 143 in the FIG. 8.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for aligning stack memory in a data processing system wherein the stack memory provides temporary storage for storing data during a call to a function having one or more parameters, said method comprising the steps of:

(a) determining if any one of said parameters are of a selected type;

(b) if a parameter is of said selected type, generating code for aligning said parameter on a special boundary in the stack memory and said aligned parameter providing a reference point in the stack memory for said function being called for aligning variables local to said called function;

(c) generating code for aligning the parameters not being of said selected type on a default boundary in the stack memory.

2. The method as claimed in claim 1, further including step (d) for generating code for aligning said local variables in the stack memory with respect to said reference point.

3. The method as claimed in claim 1, wherein said step of determining if anyone of said parameters are of a selected type further comprises determining if the function includes more than one parameter of the selected type and selecting the parameter in the lexically left most position for step (b).

4. The method as claimed in claim 1, wherein said step of determining if any one of said parameters are of a selected type further comprises determining if the function includes more than one parameter of the selected type and selecting those parameters from the resulting group of selected parameters wherein alignment for the greatest number of parameters on the special boundary is maintained in the stack.

5. The method as claimed in claim 1, wherein said step (a) further comprises determining if the function includes an invariant parameter list and determining if said invariant parameter list includes a parameter of the selected type, and if said invariant parameter list does not include a parameter of the selected type generating an instruction to align a return address for the function on the special boundary, and said aligned return address providing a reference point in the stack memory.

6. The method as claimed in claim 5, further including a step for generating code for aligning local variables in the stack memory in relation to said reference point wherein said variables are locally defined in said called function.

7. The method as claimed in claim 1, wherein said step (a) further comprises determining if the function includes a variable parameter list and determining if said variable parameter list includes a parameter of the selected type, and if said variable parameter list includes a parameter of the selected type generating, said parameter is aligned on the special boundary.

8. The method as claimed in claim 5, wherein said step (a) further comprises determining if the function includes a variable parameter list, and determining if said invariant parameter list includes a parameter of the selected type, and if said invariant parameter list does not include a parameter of the selected type, determining if said variable parameter includes a parameter of the selected type, and if said variable parameter list includes a parameter of the selected type generating, said parameter is aligned on the special boundary.

9. A system for aligning stack memory in a data processing system wherein the stack memory provides temporary storage for storing data during a call to function having one or more parameters, said system comprising:

means for determining if any one of said parameters if of a selected type;

means for generating code for aligning said parameter on a special boundary in the stack memory if a parameter is of said selected type and said aligned parameter providing a reference point for said called function for aligning local variables in the stack memory;

means for generating code for aligning the parameters not being of said selected type on a default boundary in the stack memory.

10. The system as claimed in claim 9, further including means for generating code for aligning said local variables in the stack memory with respect to said aligned parameter.

11. The system as claimed in claim 9, wherein said means for determining if any one of said parameters are of a selected type further comprises means for determining if the function includes more than one parameter of the selected type and means for selecting the parameter in the lexically left most position for alignment.

12. In a compiler for converting a high level source code program into a machine executable program, the compiler including a lexer, parser and semantic analyzer for translating high level source code program into an intermediate language, an optimizer for optimizing the intermediate language and a code generator for generating machine code from said intermediate language, the improvement comprising a stack alignment module in the code generator for aligning stack memory wherein the stack memory provides a temporary storage for storing data during a call to a function having one or more parameters, said stack alignment module comprising:

means for determining if any one of said parameters is of a selected type;

means for generating code for aligning said parameter on a special boundary in the stack memory if a parameter is of said selected type and said aligned parameter providing a reference point in the stack memory for said function being called;

means for generating code for aligning the parameters not being of said selected type on a default boundary in the stack memory.

13. The stack alignment module as claimed in claim 12, further including means for generating code for aligning local variables in the stack memory wherein said variables are locally defined in said called function and aligned in the stack memory with respect to said reference point.

14. A computer program product for use in a computer system to compile a high level source code program and generate a machine executable program, said computer program product comprising:

a recording medium;

means recorded on said medium for instructing said computer system to perform the steps of,
(a) translating said high level source code into an intermediate language program;
(b) optimizing said intermediate language program;
(c) generating the machine executable program from said intermediate language program;
(d) wherein said step of generating the machine executable program includes generating code for aligning stack memory in a data processing system wherein the stack memory provides temporary storage for storing data during a call to a function having one or more parameters comprising the steps of:
determining if any one of said parameters are of a selected type;
if a parameter is of said selected type, generating code for aligning said parameter on a special boundary in the stack memory and said aligned parameter providing a reference point in the stack memory for the function being called for aligning variables local to the called function;
generating code for aligning the parameters not being of said selected type on a default boundary in the stack memory.

* * * * *

UNITED STATES PATENT AND TRADEMARK OFFICE
CERTIFICATE OF CORRECTION

PATENT NO. : 6,070,010  
DATED : May 30, 2000  
INVENTOR(S) : John D. Keenleyside, et al.

It is certified that error appears in the above-identified patent and that said Letters Patent is hereby corrected as shown below:

Column 1
Line 25: "--or--" should read -- -of- --

Column 6
Line 21: "not" should read --no--

Column 8
Line 6: "argument" should read --arguments--

Column 9
Line 48: "to function" should read --to a function--

Column 9
Line 50: "if of" should read --is of--

Signed and Sealed this

Twelfth Day of June, 2001

*Attest:*

*Attesting Officer*

NICHOLAS P. GODICI
*Acting Director of the United States Patent and Trademark Office*